(12) United States Patent
Okoniewska et al.

(10) Patent No.: US 8,956,679 B2
(45) Date of Patent: Feb. 17, 2015

(54) PROCESS TOLERANT STARCH COMPOSITION WITH HIGH TOTAL DIETARY FIBER CONTENT

(75) Inventors: Monika Okoniewska, Princeton, NJ (US); Ian L. Brown, Gymea Bay (AU); Wolfgang Bindzus, Hatfield (GB); Ralph M. Trksak, Manville, NJ (US)

(73) Assignee: Corn Products Development Inc., Sao Paulo (BR)

( * ) Notice: Subject to any disclaimer, the term of this patent is extended or adjusted under 35 U.S.C. 154(b) by 1232 days.

(21) Appl. No.: 11/677,756

(22) Filed: Feb. 22, 2007

(65) Prior Publication Data

US 2007/0219160 A1 Sep. 20, 2007

Related U.S. Application Data

(60) Provisional application No. 60/784,055, filed on Mar. 20, 2006.

(51) Int. Cl.
| | | |
|---|---|---|
| A21D 2/16 | (2006.01) | |
| A23L 1/0522 | (2006.01) | |
| A23L 1/308 | (2006.01) | |
| C08B 30/12 | (2006.01) | |
| C08B 31/06 | (2006.01) | |

(52) U.S. Cl.
CPC .............. A23L 1/0522 (2013.01); A23L 1/308 (2013.01); C08B 30/12 (2013.01); C08B 31/066 (2013.01)
USPC ........... 426/549; 426/578; 426/448; 426/446; 426/547; 426/442; 426/661

(58) Field of Classification Search
USPC ......... 426/547, 442, 578, 549, 448, 446, 661; 127/71
See application file for complete search history.

(56) References Cited

U.S. PATENT DOCUMENTS

| | | | |
|---|---|---|---|
| 5,281,276 A | 1/1994 | Chiu et al. | |
| 5,409,542 A | 4/1995 | Henley et al. | |
| 5,480,669 A * | 1/1996 | Zallie et al. | 426/549 |
| 5,554,660 A | 9/1996 | Altieri et al. | |
| 5,797,984 A | 8/1998 | Billmers et al. | |
| 5,855,946 A * | 1/1999 | Seib et al. | 426/549 |
| 6,022,575 A | 2/2000 | Lee et al. | |
| 6,352,733 B1 | 3/2002 | Haynes et al. | |
| 6,451,367 B1 | 9/2002 | McNaught et al. | |
| 6,929,815 B2 | 8/2005 | Bengs et al. | |
| 2004/0158056 A1 | 8/2004 | Hiemstra et al. | |

FOREIGN PATENT DOCUMENTS

| | | |
|---|---|---|
| EP | 0 796 868 A2 | 9/1997 |
| EP | 0 564 893 B1 | 6/1998 |
| EP | 0 735 087 B1 | 5/2001 |
| JP | 10-195104 A | 7/1998 |
| WO | WO 93/13125 | 7/1993 |
| WO | 98/54973 A1 | 12/1998 |
| WO | WO 01/42309 | 6/2001 |
| WO | WO 02/00806 A2 | 1/2002 |
| WO | WO 02/088188 A1 | 11/2002 |

OTHER PUBLICATIONS

Sang, et al., "Resistant Starches from Amylose Mutants of Corn by Simultaneous Heat-Moisture Treatment . . . ", Carbohydrate Polymers, Applied . . . , vol. 63, 2006, pp. 167-175.
Singh et al., "Factors influencing the Physico-chemical, morphological, thermal . . . ," Food Hydrocolloids, vol. 21, (2007), pp. 1-22.
English translation of Ito JP 10-195104 A, 1998.
Dictionary of Starch Science, 1st Ed., pp. 417-419, 2003 (Japanese).
S. Varavinit et al., FFI Journal, No. 175, 1999.
May 13, 2011 Letter from Seiwa Patent & Law citing, as prior art exhibits in the present case, the WO 98/54973 patent application and the JP 10-195104A.

* cited by examiner

*Primary Examiner* — Drew Becker
*Assistant Examiner* — Preston Smith
(74) *Attorney, Agent, or Firm* — Karen G. Kaiser

(57) ABSTRACT

The present invention relates to a starch composition with high total dietary fiber (TDF) that retains its TDF upon processing. In particular, over 50% of such fiber is retained upon extrusion processing. Such starch is useful in the manufacture of high fiber food products, including extruded products such as breakfast cereals and snacks.

4 Claims, No Drawings

PROCESS TOLERANT STARCH COMPOSITION WITH HIGH TOTAL DIETARY FIBER CONTENT

This application claims priority to provisional application U.S. Ser. No. 60/784,055 filed 20 Mar., 2006.

The present invention relates to a starch composition with high total dietary fiber that retains over 50% of such fiber upon processing, such as in extrusion processes.

BACKGROUND OF THE INVENTION

Starch is a complex carbohydrate composed of two types of polysaccharide molecules, amylose, a mostly linear and flexible polymer of D-anhydroglucose units that are linked by alpha-1,4-D-glucosidic bonds, and amylopectin, a branched polymer of linear chains that are linked by alpha-1,6-D-glucosidic bonds.

Research literature indicates that starches high in fiber have numerous beneficial effects, including colonic health and a reduced caloric value. In addition, the starches may provide reduced meal carbohydrate content, reduced glycemic and insulimic responses, impact satiety and contribute to sustained energy release, weight management, control of hypoglycemia, hyperglycemia, impaired glucose regulation, insulin resistance syndrome, type II diabetes mellitus, and improved athletic performance, mental concentration and memory.

It is known that certain starch processing operations including chemical, enzymatic, and physical modifications, may increase the dietary fiber content of starch. Unfortunately, the dietary fiber content of many of these starches does not withstand the harsh conditions of processing, particularly extrusion, resulting in extruded products with substantially reduced fiber. In order to keep the total dietary fiber content high, either alternative sources of fiber have been used, or the amount of starch has been increased to allow for such processing loss. Unfortunately, alternative sources of fiber often do not provide the same health benefits which are recognized for high fiber resistant starches, have a negative effect on final product functional properties, and/or present a need to significantly change processing conditions. Further, use of high amounts of starch can be deleterious to the organoleptic properties of the product and does not present an economical solution.

Surprisingly, it has now been discovered that starch chemically crosslinked with sodium trimetaphosphate or a combination of sodium trimetaphosphate and sodium tripolyphosphate and heat-moisture treated may be extruded under a variety of different shear levels, or otherwise harshly processed, yet retain over 50% of its total dietary fiber content.

SUMMARY OF THE INVENTION

The present invention relates to a starch composition with high total dietary fiber (TDF) that retains its TDF upon processing. In particular, over 50% of such fiber is retained upon extrusion processing. Such starch is useful in the manufacture of high fiber food products, including extruded products such as breakfast cereals and snacks.

The term "total dietary fiber content" ("TDF") may include the polysaccharides and remnants of plant materials that are resistant to hydrolysis (digestion) by human alimentary enzymes, including nonstarch polysaccharides, resistant starch, lignin and minor components such as waxes, cutin and suberin. As used herein, TDF is defined as measured by the weight of undigested material as described using the method described by the Association of Official Analytical Chemists, International (AOAC) method 991.43 (Journal of AOAC, Int., 1992, v. 75, No. 3, p. 395-416). Total dietary fiber is reported on a dry basis. See the test described in the Examples section, infra.

The term "resistant starch (RS)" is defined as the sum of starch and starch degradation products that are not absorbed in the small intestine of healthy individuals and may be measured by a variety of tests known in the art. Resistant starch is defined herein as measured by treatment with pancreatic alpha amylase in the test described in the Examples section, infra.

As used herein, "high amylose starch" is intended to mean a starch or flour containing at least about 27% amylose for wheat or rice starch or flour and at least about 40% amylose for other sources, by weight of its starch as measured by the potentiometric titration method detailed in the Examples section, intra.

The term "granular starch" as used herein, means a starch which retains its granular structure and has some crystallinity, such that the birefringence and the Maltese cross under polar light are not destroyed.

As used herein, a food product is intended to include all edible products and includes beverages, for human and/or animal consumption.

DETAILED DESCRIPTION OF THE INVENTION

The present invention relates to a starch composition with high total dietary fiber (TDF) that retains its TDF upon processing. In particular, over 50% of such fiber is retained upon extrusion processing. Such starch is useful in the manufacture of high fiber food products, including extruded products such as breakfast cereals and snacks.

The starch used in preparing the present invention may be any starch derived from any native source. A native starch as used herein, is one as it is found in nature. Also suitable are starches derived from a plant obtained by standard breeding techniques including crossbreeding, translocation, inversion, transformation, insertion, irradiation, chemical or other induced mutation, or any other method of gene or chromosome engineering to include variations thereof. In addition, starch derived from a plant grown from induced mutations and variations of the above generic composition which may be produced by known standard methods of mutation breeding are also suitable herein.

Typical sources for the starches are cereals, tubers and roots, legumes and fruits. The native source can be any variety, including without limitation, sourced from corn, potato, sweet potato, barley, wheat, rice, sago, amaranth, tapioca, arrowroot, canna, pea, banana, oat, rye, triticale, and sorghum, as well as low amylose (waxy) and high amylose varieties thereof. Low amylose or waxy varieties is intended to mean a starch or flour containing less than 10% amylose by weight, in one embodiment less than 5%, in another less than 2% and in yet another embodiment less than 1% amylose by weight of the starch.

In one embodiment the starch is a non-waxy starch and in another embodiment a high amylose corn starch. In yet another embodiment, the high amylose starch contains at least about 50% amylose, in a second embodiment at least about 70% amylose, in a third embodiment at least about 80% amylose, and in a fourth embodiment at least about 90% amylose, all by weight.

In another embodiment, the high amylose starch is extracted from a plant source having an amylose extender genotype (recessive or dominant). In another embodiment, the starch contains less than 10% by weight amylopectin as determined by the butanol fractionation methodology. In yet another embodiment the starch is derived from a plant breeding population, such as corn, which is a genetic composite of germplasm selections and comprises at least 75% by weight amylose, and in one case at least 85% amylose (i.e., normal amylose), less than 10%, by weight, and in another case less than 5%, amylopectin, and from about 8 to 25% low molecular weight amylose. In a further embodiment, the starch is extracted from the grain of a starch-bearing plant having a recessive amylose extender genotype coupled with numerous amylose extender modifier genes. Such plants are known and described in the art.

The starch is modified using sodium trimetaphosphate (STMP) or a combination of sodium trimetaphosphate and sodium tripolyphosphate (STMP/STPP) and by heat moisture treatment (hydrothermal treatment). These two modifications may be conducted by the skilled artisan in either order using the following guidance.

The phosphorylation is conducted using methods known in the art such as those described for example in *Modified Starches: Pronerties and Uses*, Ed. Wurzburg, CRC Press, Inc., Florida (1986). The amount of modification may be varied to get the desired properties and total dietary fiber content.

The starches are chemically modified by reacting the starch in the presence of water and with the STMP or the STMP and STPP under conditions of pH and temperature to yield a modified starch. One method of reaction involves initially forming a slurry of the starch in water and adding the crosslinking agent to the slurry. The slurry may be from about 15-60% starch, and in one case from about 30-50% starch, by weight. In one embodiment, reaction conditions include a basic pH of greater than 10.0 and in one case greater than 10.5. In another embodiment, reaction conditions include a pH of from about 10-13 and in one case from about 11-12. The pH may be adjusted, as necessary, during the reaction to maintain it at the desired basic pH levels mentioned. The reaction temperature is from about 25° C. to 70° C., and in one case from about 30° C. to 50° C.

The reaction needs to be carried out only for a sufficient time to provide the desired degree of resistance to alpha amylase digestion, conventionally from about 10 minutes to 24 hours and in one case from about 1-3 hours. In one embodiment, from about 0.1-20% sodium sulfate and/or sodium chloride by weight of the starch is added to the slurry. The presence of these salts serves to retard gel formation during the reaction and to accelerate the reaction by increasing the base adsorbed by the starch granules.

The starches are cross-linked by phosphorylation to form distarch phosphate esters, although mono-substituted phosphate groups may increase as well, and contain at least 0.1% by weight residual phosphorus. In one embodiment, the residual phosphorus is at least about 0.2%, in another at least about 0.3%, and in still yet another at least 0.35%, by weight of the starch. In a further embodiment, the residual phosphorus is in the range of 0.1-0.4% by weight of the starch. The phosphorylating agent is selected from the group consisting of STMP, a mixture of STMP and STPP and in one instance is a mixture of STMP and STPP. In one embodiment, the reaction is conducted so as to favor crosslinking over substitution.

Generally, where the mixture is used, it should comprise from about 1-20% by weight STMP and in one case from about 5-16% weight STMP, and from about 0.01-0.2% by weight STPP and in one case from about 0.05-0.16% by weight STPP. The STMP/STPP mixture is advantageously used at a level of from about 1-20% by weight and in one case from about 5-16% by weight, based upon the weight of the starch. Where STMP is used alone, the above ranges may also be employed.

Crosslinking starch with phosphorus oxychloride ($POCl_3$) to substantially the same residual phosphorus levels and heat moisture treating would result in starches with similar properties and functionality.

The starch is heat moisture treated using methods known in the art such as those described for example in U.S. Pat. No. 5,593,503. The amount of heat and moisture may be varied to get the desired properties and total dietary fiber content. In preparing the starch of this invention, it is necessary that the starch be processed for a specified time at a specified total water content and defined temperature combination so as to avoid partially or fully gelatinizing the starch so that it retains its granular structure.

The heat-moisture treatment is conventionally conducted by hydrating the starch to attain a moisture content of between about 10 and 80%, and then heat treating at temperatures of between 65° and 160° C. The particular moisture content and heat treatment conditions are dependent upon the type and processing of the starch used as well as the amount of total dietary fiber desired. In one embodiment, the heat-moisture treatment is conducted using dynamic heating, such that the starch is mixed during heating. Dynamic heating may be accomplished using methods known in the art, including using conventional mixing or in an apparatus which provides mixing such as fluid bed reactor or mixer, horizontal mechanical mixer, or a heated mixer.

The total moisture or water content of the starch to be heat-treated will typically be in a range of from about 10 to about 80% by weight, in one embodiment from about 15% to about 55%, and in another embodiment from about 20% to about 45% by weight, and in yet another embodiment from about 20% to about 35%, based on the weight of the dry starch. In one embodiment, this relative level of moisture is maintained during a substantial portion of the heating step and is accomplished by methods known in art, for instance, by heating in a sealed container. In another embodiment, no water is added to the starch during heating (i.e., no water is present during the heating step other than the moisture content of the starch). In yet another embodiment, the moisture content is not controlled (kept substantially constant) during the hydrothermal treatment such that the treated starch has a lower moisture content once processed.

The starch with specified moisture content is typically heated at a temperature of from about 65 to 160° C., in one embodiment from about 90 to 130° C., in another embodiment from about 90 to about 120° C. The most desirable temperature may vary depending on the botanical source of the starch, degree of processing and the moisture content. Also, the time over which the starch is heated varies according to the starch source, its degree of processing, moisture content, heating temperature as well as the level of total dietary fiber content desired.

Typically, the heating time will be from about 0.25 to 24 hours and in one embodiment from about 1 to 4 hours. However, shorter times may be used dependent upon the equipment in which the treatment is conducted. In one embodiment, the heat-moisture treatment is performed at a very short time of 30 seconds to 15 minutes in a continuous heat exchanger such as a preconditioner typically used for extrusion cooking. In another embodiment, the crosslinked starch is added to the cereal formulation and the heat-moisture treatment is performed at very short times (30 sec-15 min) in a preconditioner such as before extrusion.

Further, one skilled in the art would understand that the heat-moisture treatment may be conducted on the grain such that the starch extracted from such grain would already be heat-moisture treated and only crosslinking would be necessary or that a crosslinked starch could be used in the formulation and the heat-moisture treatment could be conducted on the cereal formulation, such as in a preconditioning step prior to extrusion.

The above time, temperature and moisture conditions may be varied so long as the granular structure of the starch is not destroyed and the granules remain birefringent such that the Maltese cross is not destroyed when viewed under polarized light. Under some conditions, such as at high moisture and high temperature, the starch granule may appear partially swollen but the crystallinity is not destroyed.

The resultant starches may be modified with other conventional reagents and/or processes to impact textural or functional properties other than total dietary fiber enhancement. In one embodiment, the remaining amorphous regions are removed from the granular resistant starch by degradation using alpha-amylase or acid treatment in order to further increase the total dietary fiber content.

The resultant starches may be pH adjusted using conventional means to any desired range, and in one embodiment are pH adjusted to a pH of from about 6 to 8. The resultant starches may be washed to remove at least some and, in one embodiment, substantially all, the solubles. Solubles include salts and low molecular weight starch products such as sugars.

The resultant starches may also be dried using conventional means such as air or belt drying or fluid bed drying to reach an equilibrium moisture of between about 10 to about 15% by weight moisture. Other methods of drying may be used so long as the granular structure of the starch is not substantially destroyed.

Under certain conditions, the phosphorylated, heat-moisture treated starches of the present invention may exhibit a desirable increase in resistant starch content as well as an increase in total dietary fiber content.

The level of increase in dietary fiber content of the phosphorylated, heat-moisture treated starch will vary depending on the processing conditions used as well as the particular base starch used. In one embodiment the starch will have at least a 50%, in another embodiment at least a 60%, in yet another embodiment at least a 70%, in still yet another embodiment at least an 80%, absolute increase in total dietary fiber compared to the unmodified (native) starch.

The phosphorylated, heat-moisture treated starch will have a total dietary fiber content of at least 70%, in one embodiment at least 80% and in another embodiment at least 90% by weight of the starch.

The resultant starch has a high process tolerance in that it does not easily lose its TDF content under high heat, pressure and/or shear. This makes the starch of the present invention useful for increasing the TDF content of a variety of products in which high TDF starches are not as functional. High processing includes, without limitation, retorting, emulsifying, homogenizing, frying, high speed mixing, ultra-high temperature processing (UHT) and extrusion. In one embodiment, the resultant starch substantially retains its TDF content during extrusion and in another embodiment during high temperature (above 40° C.) extrusion.

Extrusion of the food formulation may be conducted using any suitable equipment and process parameters known in the art. Since a large number of combinations of process parameters exist, e.g., product moisture, screw design and speed, feed rate, barrel temperature, die design, formula and length/diameter (L/D) ratios, Specific Mechanical Energy (SME) and Product Temperature (PT) have been used in the art to describe the process parameter window of the extrusion. In one embodiment, the food formulation is exposed to an SME of no greater than 150 Wh/kg and a PT of no greater than 145° C., and in another embodiment to an SME of no greater than 125 Wh/kg and a PT of no greater than 115° C.

Upon processing (including extrusion), the resultant food composition retains a total dietary fiber content of at least 50% (w/w) of the preprocessed (e.g., pre-extruded) dry blend formulation, in one embodiment at least 60%, and in another at least 75%, and in yet another at least 85% (w/w) of the preprocessed dry blend formulation. For high amylose starches, the resultant food composition retains a total dietary fiber content of at least 70% (w/w) of the pre-processed dry blend formulation, in one embodiment at least 80%, in another at least 85%, and in yet another at least 95% (w/w) of the pre-processed dry blend formulation.

The starch of this invention may also be used in a food product which has not been exposed to harsh (high) processing conditions. The starch will contribute to the total dietary fiber and lower the caloric content of such food product.

Typical food products include, but are not limited to, breakfast cereals such as ready-to-eat, puffed or expanded cereals, flaked cereals, and cereals which are cooked before eating; baked goods such as breads, crackers, cookies, cakes, muffins, rolls, pastries and other grain-based ingredients; pasta; beverages; fried and coated foods; snacks; dairy products such as puddings; and cultured dairy products such as yogurts, cheeses, and sour creams. Extruded food compositions include without limitation, cookies, biscuits, breakfast cereals, snacks, pasta and condiments as well as animal food products and any other extruded product in which a higher fiber content is desired.

The amount of dietary fiber which can be added and used in any given food will be determined to a great extent by the amount that can be tolerated from a functional standpoint. In other words, the amount of high TDF starch used generally may be up to what is acceptable in organoleptic evaluation of the food. In one embodiment, the starch of this invention is used in an amount of about 2 to 50%, by weight of the food, in another embodiment, from about 10 to 25% by weight of the food.

In one embodiment, the resultant starch is substituted for at least part of the fiber of the conventional formulation. In another embodiment, the resultant starch is substituted for at least part of the starch of the conventional formulation. The starch may be added to the formulation in the same manner as any other starch, and in one embodiment is added by mixing the starch directly into the formulation and in another by adding it in the form of a solution or dispersion.

The resultant food composition may be formulated to achieve the desired total dietary fiber content. In one embodiment, the composition is formulated to increase the total dietary fiber content by from 2 to 45% and in another embodiment by from 3 to 25% by weight compared to the same composition without the modified starch. In yet another embodiment, the composition is formulated such that the total dietary fiber content of the composition is at least 10% (w/w) greater and in yet another at least 20% (w/w) greater than the same composition without the modified starch.

The starches of this invention may also be used in a pharmaceutical or nutritional product, including but not limited to prebiotic and probiotic compositions, diabetic foods and supplements, dietetic foods, foods to control glycemic response, and tablets and other pharmaceutical dosage forms.

The compositions made using the modified starches of this invention may contain at least one additional ingredient appropriate for consumption, such as food and/or pharmaceutical ingredients such as water.

The compositions made using the modified starches of this invention may be fed to (ingested by) any animal, in one embodiment to mammals and in another embodiment to humans. Such compositions may contribute to the health of the animal in the same or similar manner as other food compositions which contain dietary fiber and/or resistant starch, including without limitation by attenuating the glycemic and insulinemic response, reducing plasma triglycerides and cholesterol, increasing short chain fatty acids, acting as a prebiotic to increase the proliferation and/or activity of probiotic bacteria such as lactobacillus and bifidobacteria, and increasing micronutrient absorption such as calcium.

EXAMPLES

The following examples are presented to further illustrate and explain the present invention and should not be taken as limiting in any regard. All parts and percentages are given by weight and all temperatures in degrees Celsius (° C.) unless otherwise noted.

The following test procedures were used throughout the examples.

A. Total Dietary Fiber Determination

The following procedure outlines the determination of total dietary fiber content using AOAC method 991.43 (Journal of AOAC, Int., 1992, v. 75, No. 3, p. 395-416).

The test is performed using Megazyme AOAC 991.43 TDF method kit, K-TDFR:
1. Blanks
  With each assay, run two blanks along with samples to measure any contribution from reagents to residue.
2. Samples
  a. Weigh duplicate 1.000±0.005 g samples accurately into 400 ml tall-form beakers.
  b. Add 40 ml 0.05M MES-TRIS blend buffer solution (pH 8.2) to each beaker. Add magnetic stirring bar to each beaker. Stir on magnetic stirrer until sample is completely dispersed in solution.
3. Incubation with heat-stable α-amylase
  a. Add 50 µl heat-stable α-amylase solution, while stirring at low speed.
  b. Cover each beaker with aluminum foil squares.
  c. Place covered samples in shaking water bath at 95-100° C., and incubate for 35 min with continuous agitation. Start timing once all beakers are in hot water bath.
4. Cool.
  a. Remove all sample beakers from hot water bath and cool to 600° C.
  b. Remove foil covers.
  c. Scrape any ring around beaker and gels in bottom of beaker with spatula, if necessary.
  d. Rinse side wall of beaker and spatula with 10 ml distilled water by using pipette.
  e. Adjust temperature of water bath to 60° C.
5. Incubation with protease
  a. Add 100 µl protease solution to each sample.
  b. Cover with aluminum foil.
  c. Incubate in shaking water bath at 60±1° C., with continuous agitation for 30 min. Start timing when temperature of water bath reaches 60° C.
6. pH adjustment
  a. Remove sample beakers from shaking water bath.
  b. Remove covers.
  c. Dispense 5 ml of 0.561 N HCl solution into sample while stirring on magnetic stirrer.
  d. Check pH, which should be 4.1-4.8. Adjust pH, if necessary, with additional 5% NaOH solution or 5% HCl solution.
7. Incubation with amyloglucosidase
  a. Add 200 µl amyloglucosidase solution while stirring on magnetic stirrer.
  b. Replace aluminum cover.
  c. Incubate in shaking water bath at 60° C. for 30 min, with constant agitation. Start timing when temperature of water bath reaches 60° C.
8. Precipitation of dietary fiber with EtOH.
  a. To each sample, add 225 ml 95% EtOH preheated to 60° C. Measure volume after
  heating. Ratio of EtOH volume to sample volume should be 4:1.
  b. Cover all samples with large sheets of aluminum foil.
  c. Allow precipitate to form at room temperature for 60 minutes.
9. Filtration setup
  a. Tare crucible containing Celite to nearest 0.1 mg.
  b. Wet and redistribute bed of Celite in crucible using 15 ml of 78% EtOH from wash bottle
  c. Apply suction to crucible to draw Celite onto fritted glass as even mat.
10. Filtration
  a. Filter precipitated enzyme digest from step 8 through crucible into a filtration flask.
  b. Using a wash bottle with 78% EtOH transfer all remaining particles to crucible.
11. Wash residue twice with 15 ml portions of the following:
  a. 78% EtOH.
  b. 95% EtOH
  c. Acetone
12. Dry crucible containing residue overnight in 103° C. oven.
13. Cool crucible in desiccator for approximately 1 hr. Weigh crucible containing dietary fiber residue and Celite to nearest 0.1 mg. To obtain residue weight, subtract tare weight, i.e., weight of dried crucible and Celite.
14. Protein and ash determination.
  One residue from each type of fiber is analyzed for protein, and the second residue of the duplicate is analyzed for ash.
  a. Perform protein analysis on residue using Kjeldahl method (AACC 46-10). Use 6.25 factor for all cases to calculate grams of protein.
  b. For ash analysis, incinerate the second residue for 5 hr at 525° C. as described in AACC method 08-01. Cool in desiccator and weigh to nearest 0.1 mg. Subtract crucible and Celite weight to determine ash.

Total dietary fiber is calculated according to the formula presented below and is reported on dry basis unless indicated otherwise.

$$TDF (\%) = [(R1-R2)/2 - P - A - \text{blank}]/(m1+m2)/2 \times 100$$

Where:
m1—sample weight 1
m2—sample weight 2
R1—residue weight from m1
R2—residue weight from m2
A—ash weight from R1
P—protein weight from R2

B. Resistant Starch Analysis

Resistant starch content was determined by a simulated digestion described by Englyst et al. (British Journal of Nutrition, 1996, 75, 327-337; European Journal of Clinical Nutrition, 1992, 46, S33-S50)

Food samples are ground/minced as if masticated. Powder starch samples are screened to a particle size of 250 microns or less. The weight of a sample necessary for analysis is determined based on its carbohydrate content. Starch samples are considered to consist primarily of carbohydrates. Samples are measured to provide 500-600 mg+0.1 mg of carbohydrate per sample. The required amount of a sample is weighed and added to the sample tube. 10 ml of pepsin (0.5%), guar gum (0.5%) in HCl (0.05 M) solution are added to each tube.

Blank and glucose standard tubes are prepared. The blank is 20 ml of a buffer containing 0.25 M sodium acetate and 0.02% calcium chloride. Glucose standards are prepared by mixing 10 ml sodium acetate buffer (described above) and 10 ml of 50 mg/ml glucose solution. Standards are prepared in duplicate.

The enzyme mix is prepared by adding 12 g of porcine pancreatin (Sigma P-7545) to 85 ml of deionized water, mixing well, then centrifuging at 3000 g for 10 minutes. The supernatant is collected and 40 mg of dry invertase (Sigma I-4504) and 1.0 ml AMG E or AMG 300 L (Novozymes) are added.

The sample tubes are pre-incubated at 37° C. for 30 min, then removed from the bath and 10 ml of sodium acetate buffer is added along with glass balls/marbles (to aid in physical breakdown of the sample during shaking).

5 ml of the enzyme mixture is added to the samples, blank, and standards @ 20-30 sec. intervals. Tubes are shaken horizontally in a 37° C. water bath at approximately 180 strokes/min. Time "zero" represents the first addition of the enzyme mixture to the first tube.

After 20 and 120 minutes, 0.5-ml aliquots are removed from the incubating samples (at the same 20-30 sec intervals) and each placed into a separate tube of 19 ml 66% ethanol (to stop the reaction). After 1 hour, an aliquot is centrifuged in the micro-centrifuge tubes at 3000 g for 10 minutes.

The glucose concentration in each tube is measured using the glucose oxidase/peroxidase method (Megazyme Glucose Assay Procedure GLG9/96). 3 ml of GOPOD are placed into a culture tube, then 0.1 ml of sample aliquot is added, mixed well (light vortex setting) then incubated for 20 minutes at 50° C. The incubated samples are tested using the UV spectrophotometer for absorbance at 510. This is a calorimetric procedure.

The degree of starch digestion is determined by calculating the glucose concentration against the glucose standards, using a conversion factor of 0.9. The resistant starch (RS) is the portion of the total starch (TS) that has not been digested by the 120 min (GR 120) time point. Percent resistant starch is calculated as RS (% db)=TS-GR120×100, were TS=100 and GR120=the percent of TS digested in 120 minutes.

C. Amylose Analysis

Potentiometric Determination of Amylose Content

Approximately 0.5 g of a starch (obtained from 1.0 g of ground grain) sample was heated in 10 ml of concentrated calcium chloride (about 30% by weight) to 95° C. for 30 min. The sample was cooled to room temperature, diluted with 5 ml of 2.5% uranyl acetate solution, mixed well, and centrifuged for 5 min at 2000 rpm. The sample was then filtered to give a clear solution. The starch concentration was determined polarimetrically, using 1 cm polarimetric cell. An aliquot of the sample (normally 5 ml) was then directly titrated with a standardized 0.01N iodine solution while recording the potential using a platinum electrode with a KCl reference electrode. The amount of iodine needed to reach the inflection point was measured directly as bound iodine. The amount of amylose was calculated by assuming 1.0 gram of amylose will bind with 200 milligrams of iodine.

D. Bound (residual) Phosphorus Analysis

1. Approximately 10.0 grams of sample was weighed into a quart jar. 600 mL of 5% EDTA (ethylene diamine tetraacetic acid, sodium salt) solution was added and the slurry was mixed for 5 minutes using a magnetic mixer.

2. The starch slurry was filtered using a 2 liter filter flask, Büchner funnel and 11 cm Whatman #1 filter paper. Before the starch cake cracked, four-200 mL aliquots of purified water were poured continuously over the starch cake. The sides of the Buchner funnel were washed down with a wash bottle containing purified water.

3. 1.00 gm of the starch cake was removed from the Büchner and placed in a 125 mL Erlenmeyer flask (the moisture was determined on this sample). 25 mL of 4 N hydrochloric acid was added to the flask, along with 3 or 4 boiling chips.

4. The flask was placed on a hot plate and brought to a rolling boil, then heated for an additional 7 minutes to complete the hydrolysis of the sample, swirling occasionally. The flask mouth was covered with a small watch glass during the heating period to keep evaporation to a minimum. After 7 minutes, it was removed from the hot plate and allowed to cool to room temperature.

5. The contents were quantitatively transferred to a 250 mL volumetric flask. Several washes of purified water were used to rinse any residual in the Erlenmeyer flask into the volumetric flask. The volumetric was then diluted to the volume mark with distilled water, stoppered and shaken to give a uniform mixture.

6. Approximately 10 mL of this solution were drawn into a 10 mL disposable syringe. A 13 mm, 0.2 μm Gelman ion chromatography acrodisc syringe filter was attached to the end. The solution was transferred through the filter directly into a 15 mL disposable centrifuge tube which was then capped and labeled.

7. The collected filtrate was then analyzed on an ICP-AE spectrometer that was standardized in accordance with the manufacturer's recommendations.

8. The results were then converted into % bound (residual) phosphorus as follows:

$$\% \text{ Phosphorous} = \frac{\text{ppm Phosphorous} \times \text{dilution factor } (0.25 \text{ L}) \times 100}{\text{Anhydrous sample weight as mg}}$$

Example 1

Preparation of Phosphorylated, Heat-Moisture Treated Starches a. STMP/STPP phosphorylation 2,500 pounds (1134 kg) of tap water were measured into a reaction vessel. 100 lbs (45.4 kg) Na2SO4 were added with agitation and stirred until dissolved. With good agitation, 2,000 lbs (907.2 kg) of high amylose corn starch (sample C) or dent corn starch (sample D) were added. Then 3% NaOH was added at 4 lbs/minute (1.8 kg/minute) to the starch slurry as needed to reach 40 ml alkalinity (about 600 lbs (272.2 kg) NaOH for 46 ml alkalinity). The mixture was stirred for 1 hr and the pH recorded (pH 11.6). Temperature was adjusted to 108° F. (42° C.). For sample C, 140 lbs (63.5 kg) of a 99/1 STMP/STPP blend were added and reacted for 17 hours. The alkalinity was monitored and maintained throughout the reaction. For sample D, 240 lbs 108.9 kg) of a 99/1 STMP/STPP blend were added and reacted for 17 hours. The final pH and temperature were recorded (pH 11.4 and 108° F. (42° C.)). pH was adjusted to 5.5 with 3:1 HCl as needed (pH 5.4 using 75 lbs. HCl (34 kg)). The starch was washed and centrifuged on a Merco centrifuge and flash dried. The crosslinking resulted in a high amylose starch with 0.35% bound phosphorus (sample C) and dent corn starch with 0.39% bound phosphorus (sample D).

b. Heat-Moisture Treatment

High amylose corn starch was hydro-thermally treated using a batch process ploughshare mixer and dryer (Model: 300 HP Prestovac reactor manufactured by Processall, Cincinnati, Ohio, USA). The following conditions were used. High amylose corn starch was transferred into the reactor at room temperature. The moisture content of the high amylose corn starch was adjusted from 25 to 30% moisture (+/−1%). The moisture adjusted high amylose corn starch was heated to 121° C. (250° F.) and held at the temperature for 120 min. The hydrothermally treated starch was then cooled, and sieved through sieve U.S mesh 40.

c. Preparation of Crosslinked and Heat-Moisture Treated Starch With the Final Bound Phosphorus Level of 0.35% and Above The crosslinked starches were prepared as described in section a) with the following exceptions. For sample F intermediate, 200 lbs (90.7 kg) of STMP/STPP mixture was used which resulted in the high amylose starch with 0.50% bound phosphorus. For sample G intermediate, 260 lbs (117.9 kg) of STMP/STPP mixture was used which resulted in the dent corn starch with 0.50% bound phosphorus. The crosslinked starches were then subjected to the hydrothermal treatment as described in section b. After the hydrothermal treatment, the high amylose starch had 0.38% bound phosphorus (sample F) and dent corn starch had 0.35% bound phosphorus (sample G).

d. Preparation of Heat-Moisture Treated and Crosslinked Starch.

High amylose starch was hydrothermally treated by a procedure described in section b (sample E intermediate). The hydrothermally treated high amylose starch was then crosslinked using the procedure described in section a. The hydrothermally treated and crosslinked high amylose starch had a 0.38% bound phosphorus (sample E).

e. Preparation of Heat-Moisture Treated and Crosslinked Starch with the Final Bound Phosphorus Level of 0.26 and 0.27%.

The samples were prepared as described in section a). The crosslinking resulted in a high amylose starch with 0.35% bound phosphorus (sample H intermediate) and dent corn starch with 0.39% bound phosphorus (sample J intermediate). The samples were then subjected to hydrothermal treatment as described in section b. After the hydrothermal treatment, the high amylose starch had 0.26% bound phosphorus (sample H) and dent corn starch had 0.27% bound phosphorus (sample J).

TABLE 1

Sample Description

| Sample ID | Sample Description | Bound Phosphorus Level (%) | TDF (%) |
|---|---|---|---|
| A | High amylose starch | 0.06 | 18 |
| B | High amylose starch, hydrothermally treated | 0.06 | 64 |
| C | High amylose starch, crosslinked | 0.35 | 90 |
| D | Dent corn starch, crosslinked | 0.39 | 85 |
| E | High amylose starch, hydrothermally treated and crosslinked | 0.38 | 97 |
| F | High amylose starch, crosslinked and hydrothermally treated | 0.38 | 98 |
| G | Dent corn starch, crosslinked and hydrothermally treated | 0.35 | 86 |
| H | High amylose starch, crosslinked and hydrothermally treated | 0.26 | 92 |
| J | Dent corn starch, crosslinked and hydrothermally treated | 0.27 | 74 |

Example 2

Extrusion of Phosphorylated, Heat-Moisture Treated Starches

The extrusion processing was performed using three barrel Wenger twin screw extruder model TX 57 to prepare expanded breakfast cereal. Dry blends of ingredients were prepared according to a formula listed in Table 2. Experimental samples were used to replace degermed corn flour in the formula to achieve 5 g of fiber per 30 g serving of cereal (17%) which corresponds to a 'high fiber source' label claim as calculated for ingredients on wet basis (wb).

TABLE 2

Expanded Breakfast Cereal Control Formula.

| Ingredient | Use Level (% wb) |
|---|---|
| Degermed corn flour | 42 |
| Hard winter wheat flour | 30 |
| Whole oat flour | 20 |
| Sugar | 6 |
| Salt | 2 |

TABLE 3

Degermed Corn Flour (DCF) Replacement Levels for Individual Samples

| Sample ID | Sample in the Formula (% wb) | DCF in the Formula (% wb) |
|---|---|---|
| A | 42 | 0 |
| B | 30 | 12 |
| C | 21 | 21 |
| D | 23 | 19 |
| E | 20 | 22 |
| F | 20 | 22 |
| G | 22 | 20 |
| H | 21 | 21 |
| J | 26 | 16 |

Dry materials were blended in the ribbon mixer, Wenger Manufacturing, Inc., model No. 61001-000 for 30 min, fed into a hopper and extruded without preconditioning. The feed rate was 100-105 kg/hr. Water flow to extruder was 6.0-6.5 kg/hr. Screw speed was constant for all the samples and was 400 rpm. Extruder motor load (torque) was 40%±5. For the 3 barrel extruder design used, the barrel temperature profile was set to 50° C., 80° C., and 92° C. and was maintained within four degree range. Specific Mechanical Energy (SME) was calculated according to a formula presented below to serve as an indicator of the mechanical shear input to the process.

$$\frac{Torque_{Actual}/Torque_{Max} \times Screw\ Speed_{Actual}/Screw\ Speed_{Max} \times Engine\ Power\ Constant}{Throughput\ Rate}$$

Selected extrusion conditions are summarized in Table 3. From the extruder, expanded samples were sent to a drier. The drier temperature was set in a first zone to 130° C., and in second and third zones to 30° C. Total retention time was approximately 8 min and the final product moisture was 2-3%. At the exit of the drier, products were collected into lined boxes and packaged to minimize atmospheric moisture pick up.

TDF of the dry blends and final products was determined using AOAC 991.43 method. TDF retention was calculated according to the formula.

TDF Retention (%)=(TDF$_{sample}$×100)/TDF$_{Dry\ Blend}$

Post-Extrusion Ingredient TDF (TDF$_{PEI}$) was calculated according to the following formula TDF$_{PEI}$=(TDF$_{Ingredient}$×TDF$_{Retention}$)/100

TABLE 4

Expanded Breakfast Cereal Actual Processing Conditions.

| Sample ID | Process | | |
|---|---|---|---|
| | Moisture in Extruder (%) | Product Temperature (° C.) | SME (Wh/kg) |
| Control | 16.0 | 124 | 126 |
| A | 16.0 | 118 | 133 |
| B | 16.0 | 136 | 125 |
| C | 15.9 | 140 | 150 |
| D | 16.2 | 135 | 142 |
| E | 16.0 | 144 | 140 |
| F | 15.9 | 131 | 132 |
| G | 16.1 | 133 | 136 |
| H | 16.1 | 132 | 139 |
| J | 16.2 | 128 | 144 |

TABLE 5

Properties of Extruded Cereal

| Sample ID | TDF Retention (%) | Post Extrusion Ingredient TDF (% db) | Density (kg/m$^3$) |
|---|---|---|---|
| Control | NA* | NA* | 98 |
| A | 53 | 10 | 89 |
| B | 27 | 17 | 86 |
| C | 55 | 50 | 112 |
| D | 63 | 54 | 112 |
| E | 86 | 84 | 99 |
| F | 86 | 85 | 91 |
| G | 81 | 70 | 86 |
| H | 77 | 71 | 112 |
| J | 55 | 41 | 107 |

*NA—Not Applicable

Example 3

Comparative

The presently claimed process was compared to that of Sang and Seib (Carbohydrate Polymers 63:167-175 (2006)) using the conditions set forth as best (10% STMP/STPP and 45% moisture).

500 g (dry basis) high amylose starch (containing at least 70% amylose) were added to 700 ml water containing 25 gm Na$_2$SO$_4$ and 50.0 g (10%) of a 99:1 STMP/STPP blend. The pH was adjusted to 11.5 with a 4% NaOH solution and stirred for 1 hour. This was divided into 10 even parts (by weight) and placed in a thin layer onto a metal tray in a forced air oven at 40° C. for sufficient time to drop the moisture to 45%.

The sample at 45% moisture was placed into a quart glass jar, sealed and heated at 110° C. for 4 hours. The starch was cooled at room temperature to room temperature (25° C.), then dispersed in 100 mL distilled water and the pH was recorded. The pH was adjusted to 6.5 1M HCl, filtered and washed with seven 150 mL portions of distilled water. The starch was dried at 40° C. and analyzed for TDF and bound phosphorus.

The resultant Seib starch had 11% moisture, 79% total dietary fiber (dry basis) and 0.29% bound phosphate. Thus, the resultant starch provided a significantly lower TDF than samples prepared as per the invention even though the Seib sample was made using a higher level of the STMP/STPP blend 10% vs 7% for sample H of Example 1.

Example 4

Comparative

The present invention was compared to that of Sang and Seib (Carbohydrate Polymers 63:167-175 (2006)), using a lower level of STMP/STPP (7%), comparable to what was used to prepare the product of the invention. 500 g (dry basis) high amylose starch (containing at least 70% amylose) were added to 700 ml water containing 25 gm Na$_2$SO$_4$ and 30 or 35 g (7%) of a 99:1 STMP/STPP blend. The pH was adjusted to 11.5 with a 4% NaOH solution and stirred for 1 hour. This slurry was then placed in a thin layer onto a metal tray in a forced air oven at 4° C. for sufficient time to drop the moisture to 45%.

This sample was placed into a quart glass jar, sealed and heated at 110° C. for 4 hours. The starch was cooled at room temperature to room temperature (25° C.), then dispersed in 100 mL distilled water and the pH was recorded. The pH was adjusted to 6.5 using 1M HCl, filtered and washed with seven 150 mL portions of distilled water. The starch was dried at 40° C. and analyzed for TDF.

The final TDF of the sample was 72%, which is significantly lower than that obtained by the current invention (see Example 1, sample H).

We claim:

1. A composition comprising:
 a starch which has been
  phosphorylated using sodium trimetaphosphate or a combination of sodium trimetaphosphate and sodium tripolyphosphate and heat-moisture treated, in either order,
  wherein the phosphorylated, heat-moisture treated starch
   is granular,
   has at least an 80 absolute increase in total dietary fiber compared to the unmodified starch, and
   has a total dietary fiber content of a least 90% by weight; and
 a second ingredient appropriate for consumption.

2. The composition of claim 1, wherein the starch is a high amylose starch.

3. The composition of claim 1, wherein the starch contains from 0.1-0.4% residual phosphorus by weight of the starch.

4. The composition of claim 1, wherein the composition has been extruded.

* * * * *